United States Patent [19]

Locke

[11] Patent Number: 5,172,406

[45] Date of Patent: Dec. 15, 1992

[54] DTMF SIGNAL DETECTION APPARATUS

[75] Inventor: Michael E. Locke, Santa Clara, Calif.

[73] Assignee: ROLM Systems, Santa Clara, Calif.

[21] Appl. No.: 576,326

[22] Filed: Aug. 31, 1990

[51] Int. Cl.$^5$ ............................................. H04M 11/00
[52] U.S. Cl. ......................................... 379/88; 379/77; 379/386; 379/351
[58] Field of Search ..................... 379/88, 89, 386, 77, 379/67, 351, 417, 283

[56] References Cited

U.S. PATENT DOCUMENTS

| | | | |
|---|---|---|---|
| 4,121,053 | 10/1978 | Dick | 379/97 |
| 4,219,699 | 8/1980 | Nilssen et al. | 379/351 X |
| 4,313,038 | 1/1982 | Nilssen et al. | 379/283 |
| 4,431,872 | 2/1984 | Edwards et al. | 379/351 |
| 4,785,473 | 11/1988 | Pfeiffer et al. | 379/89 |
| 4,885,763 | 12/1989 | O'Brien et al. | 379/386 X |

OTHER PUBLICATIONS

TMS320C25 User's Guide, "Digital Signal Processor Products," Preliminary 1986, Texas Instruments, Inc.; Contents and Introduction.
1987 DSP Products Databook, Analog Devices; Introduction and Contents.
"Theory and Application of Digital Signal Processing"; Lawrence R. Rabiner and Bernard Gold; 1975; pp. 92-95, 102-103.

Primary Examiner—James L. Dwyer
Assistant Examiner—M. Shehata
Attorney, Agent, or Firm—Michael B. Einschlag

[57] ABSTRACT

Apparatus for detecting and identifying DTMF signals in connection with a voice store and forward equipment (VSF) and for preventing talk-off, whether generated by the VSF or by a user of the VSF. In particular, the apparatus for use in connection with an interface which receives an analog signal from and applies an analog signal to a telephone line, the apparatus including: (a) detection means, responsive to an analog signal received from the interface, for detecting DTMF signals in the received analog signal and for generating DTMF indication signals in response thereto; (b) means for storing a representation of the received analog signal and at least some of the DTMF indication signals and for applying at least some of the DTMF indication signals to a decision means; and (c) means for retrieving a representation of an output analog signal and a representation of output DTMF indication signals and for applying them to the decision means; wherein the decision means is means for applying the output analog signal to the interface.

15 Claims, 5 Drawing Sheets

DTMF SIGNAL DETECTION APPARATUS

TECHNICAL FIELD OF THE INVENTION

The present invention pertains to method and apparatus for detecting and identifying Dual Tone Multifrequency (DTMF) signals and, in particular, for detecting and identifying DTMF signals in connection with voice store and forward apparatus (VSF) for preventing talk-off, whether generated by the VSF or by a user of the VSF.

BACKGROUND OF THE INVENTION

A voice store and forward apparatus (VSF) such as, for example, the ROLM PhoneMail voice store and forward apparatus produced by ROLM Systems of Santa Clara, Calif., typically receives a voice message from a user and stores the message for later transmission to other users. The later transmissions are typically provided in response to commands which are received from the other users who communicate with the VSF. It is well known in the art that a VSF typically permits users to utilize Dual Tone Multifrequency (DTMF) signals to communicate therewith. This is advantageous because a user may use a telephone which is equipped with a DTMF pad—as is well known, this includes almost all telephones that are commonly used in the United States today—to generate DTMF signals to send commands to the VSF. For example, such commands may be used to request the VSF to transmit a number of stored messages. In addition, while the user is receiving stored messages, he may generate further DTMF to provide further commands to the VSF to cause it, for example, to skip one of the stored messages or to go back and replay a stored message which was previously transmitted, and so forth.

Although there is a great advantage in using DTMF signals to send commands to a VSF due to the easy availability of DTMF signaling devices in the form of pads on a telephone set, there are, at the same time, certain problems which occur when DTMF signals are used to send commands to the VSF. In particular, such problems arise from the use of a hybrid network to interface with a 2-wire telephone line which carries signals to and from the VSF. The hybrid network gives rise to problems because a typical such hybrid network has a limited ability to separate transmitted and received signals. As a result, the hybrid network converts signals which are transmitted from the VSF to a user—such signals being, for example, input command prompts and stored messages—into an additive component of signals which are received from the user, which phenomenon is referred to as crosstalk. As described below, this signal conversion causes two types of problems. The first type of problem occurs whenever the user generates a DTMF signal while the VSF is transmitting signals, i.e., voice prompts or stored messages, to the user. Due to the signal conversion which is caused by the hybrid network, the DTMF signals which are generated by the user may be corrupted by the VSF output and, as a result, be unrecognizable to the portion of the VSF which receives and identifies DTMF signals. The second type of problem occurs whenever the VSF is transmitting signals, i.e., voice prompts or stored messages, while the user is silent. Due to the signal conversion which is caused by the hybrid network, the portion of the VSF which receives and identifies DTMF signals may misidentify the additive component of the VSF output as a DTMF signal which has been received from the user. This is referred to as "self talk-off" at the DTMF receiver of the VSF and, as a result, the VSF may interpret the additive component as a command from the user and provide an unexpected and inappropriate message to the user.

Many attempts have been made to cure the above-described two problems. For example, FIG. 1 shows the block diagram of FIG. 1 of U.S. Pat. No. 4,431,872 (the '872 patent) which illustrates certain components of a typical VSF, i.e., VSF 30. As shown in FIG. 1, user telephone 10 is interconnected to VSF 30 through public switched network 20 and telephone 10 comprises TouchTone TM pad 15 which can generate DTMF signals. VSF 30 comprises controller 40, speech decoder 50, hybrid network 60, and receiver 70. Speech decoder 50 receives a message from controller 40, which message has been stored by controller 40 in, for example, digital form, and converts it into an audio signal which is applied as input to hybrid network 60 for transmission to the switching network 20 and from there, in turn, to telephone 10. In addition, receiver 70 receives signals which were generated by telephone 10. As shown in FIG. 1, receiver 70 is a "voice-protected" DTMF receiver and, as such, it decodes i.e., recognizes and identifies, DTMF signals and, in response, transmits identification and/or command codes to controller 40. The term "voice-protected" DTMF receiver refers to a DTMF receiver which is designed so that the detection requirements are relatively stringent so that the receiver will not be activated by voice signals. In a typical embodiment of telephone 10, DTMF signals are generated thereat with a tone amplitude of approximately $-10$ dBm. Further, in a typical worst case estimate, there is a tone loss through public switched network 20 of $-20$ dB and, as a result, DTMF signals which are generated at telephone 10 arrive at hybrid network 60 with an amplitude of approximately $-30$ dBm. In addition, as is well known to those of ordinary skill in the art, there is a further loss of approximately $-3$ dB in hybrid network 60, all of which provides that the DTMF signals arrive at DTMF receiver 70 with an amplitude of, approximately $-33$ dBm. Finally, there is a worst case $-15$ dBm crosstalk at hybrid network 60 which arises from the audio output from speech decoder 50. As one can readily appreciate from this, DTMF receiver 70 has to distinguish $-33$ dBm DTMF signals from a $-15$ dBm audio signal.

FIG. 2 shows the block diagram of FIG. 3 of the '872 patent which addresses the first type of problem discussed above, namely, the problem that occurs whenever a user generates a DTMF signal while the VSF is transmitting signals to the user and, as a result, the DTMF signals which are generated by the user may be corrupted by the VSF output and be unrecognizable. FIG. 2 discloses apparatus which attempts to solve this problem by shutting off the output of the VSF at certain critical times. The equipment denoted by boxes 10 through 70 are the same for FIGS. 1 and 2. However, VSF 35 of FIG. 2 further comprises: (a) "non-voice protected" DTMF receiver 80 which receives input from hybrid network 60; (b) integrator 90 which receives input from "non-voice protected" DTMF receiver 80; and (c) switch 100 which receives input from integrator 90 and from speech decoder 50. As shown in FIG. 2, the output from "non-voice protected" DTMF receiver 80 is applied as input to integrator 90 and, in response, integrator 90 outputs a signal which is applied to switch 100 which causes it to open. This interrupts the audio path between speech decoder 50 and hybrid network 60. During this time period, crosstalk across hybrid network 60 ceases and "voice-protected" DTMF receiver 70 receives DTMF signals which are transmitted to controller 40 from the user as commands. Later, when "non-voice protected" DTMF receiver 80 has determined that the user has stopped transmitting DTMF tones, switch 100 is closed and the path between speech decoder 50 and hybrid network 60 is reestablished.

However, as recognized in the '872 patent, the apparatus shown in FIG. 2 hereof has a problem in that audio output from speech decoder 50 may produce a signal that is detected by "non-voice protected" DTMF receiver 80 as a result of crosstalk through hybrid network 60. Whenever this occurs, as was described above, switch 100 will be opened and the output from VSF 35 to the user at telephone 10 will be unnecessarily interrupted. Thus, although the apparatus disclosed in FIG. 2 hereof protects against self talk-off because "voice protected" DTMF receiver 70 is slower and more selective than "non-voice protected" DTMF receiver 80, in the apparatus disclosed in FIG. 2, "non-voice protected" DTMF receiver 80 will cause switch 100 to open too often. This effect is noticeable to a user and results in substantially degraded system performance.

FIG. 3 hereof shows the apparatus disclosed in FIG. 5 of the '872 patent, which is intended to overcome this latter difficulty by utilizing a separate "non-voice protected" DTMF receiver to monitor the output from speech decoder 50. The equipment denoted by boxes 10 through 100 are the same for FIGS. 2 and 3. However, VSF 37 of FIG. 3 further comprises: (a) second "non-voice protected" DTMF receiver 110 which receives audio output from speech decoder 50; (b) inverter 130 which receives input from "non-voice protected" DTMF receiver 110; and (c) AND logic circuit 120 which receives input from integrator 90 and from inverter 130.

As shown in FIG. 3, the output from "non-voice protected" DTMF receiver 110 is applied as input to inverter 130 and, in response, inverter 130 outputs a signal which is applied to AND logic circuit 120. If the audio output from speech decoder 50 is identified as a DTMF signal by "non-voice protected" DTMF receiver 110 and, at the same time, the crosstalk of that signal through hybrid network 60 is also identified as a DTMF signal by "non-voice protected" DTMF receiver 80, then one input to AND logic circuit 120 will be up (1) and the other input will be down (0). Thus, there will be no output from AND logic circuit 120 to operate switch 100. Further, as one can readily appreciate, in order for switch 100 to be opened, both inputs to AND logic circuit 120 must be enabled. This only occurs when "non-voice protected" DTMF receiver 80 detects a DTMF signal and "non-voice protected" DTMF receiver 110 does not detect a DTMF signal in the audio output from speech decoder 50.

The solution in the prior art which was discussed above with reference to FIG. 3 hereof—wherein separate "non-voice protected" DTMF receiver 110 is used to monitor the signal output by speech decoder 50 to detect talk-off and, thereby, to minimize false output signaling—is inadequate for several reasons. First, the prior art apparatus disclosed in FIG. 3 requires the use of three DTMF receivers and this results in increased system cost and complexity. Second, the prior art apparatus disclosed in FIG. 3 does not detect and prevent self talk-off due to crosstalk from the system output.

As a result of the above, there is a need in the art for method and apparatus for detecting and identifying DTMF signals in connection with a VSF and for preventing talk-off, whether generated by the VSF or by a user of the VSF.

SUMMARY OF THE INVENTION

Embodiments of the present invention advantageously satisfy the above-identified need in the art and provide method and apparatus for detecting and identifying DTMF signals in connection with a voice store and forward apparatus (VSF) and for preventing talk-off, whether generated by the VSF or from a user of the VSF. A VSF generally operates in one of two modes: (a) a first mode wherein the VSF is transmitting a signal and the user is listening and (b) a second mode wherein the user is talking and the VSF is quiet and recording the user's speech. Potential corruption of DTMF signal reception by the VSF as a result of output from the VSF occurs only while the VSF is operating in the first mode whereas talk-off is a potential problem which occurs only while the VSF is operating in the second mode. As a result, specific embodiments of the present invention are directed to method and apparatus which optimize the first and second modes of a VSF separately to provide a VSF which provides optimum performance at all times.

In particular, one embodiment of the present invention is apparatus for use in connection with an interface which receives an analog signal from and applies an analog signal to a telephone line, the apparatus comprising: (a) detection means, responsive to an analog signal received from the interface, for detecting control signals in the received analog signal and for generating received control indication signals in response thereto; (b) means for storing a representation of the received analog signal and at least some of the received control indication signals and for applying at least some of the received control indication signals as input to a decision means; and (c) means for retrieving a representation of an output analog signal and a representation of output control indication signals and for applying them as input to the decision means; wherein the decision means is means for applying the analog signal to the interface.

BRIEF DESCRIPTION OF THE DRAWING

A complete understanding of the present invention may be gained by considering the following detailed description in conjunction with the accompanying drawing, in which.

DETAILED DESCRIPTION

Figure 3:
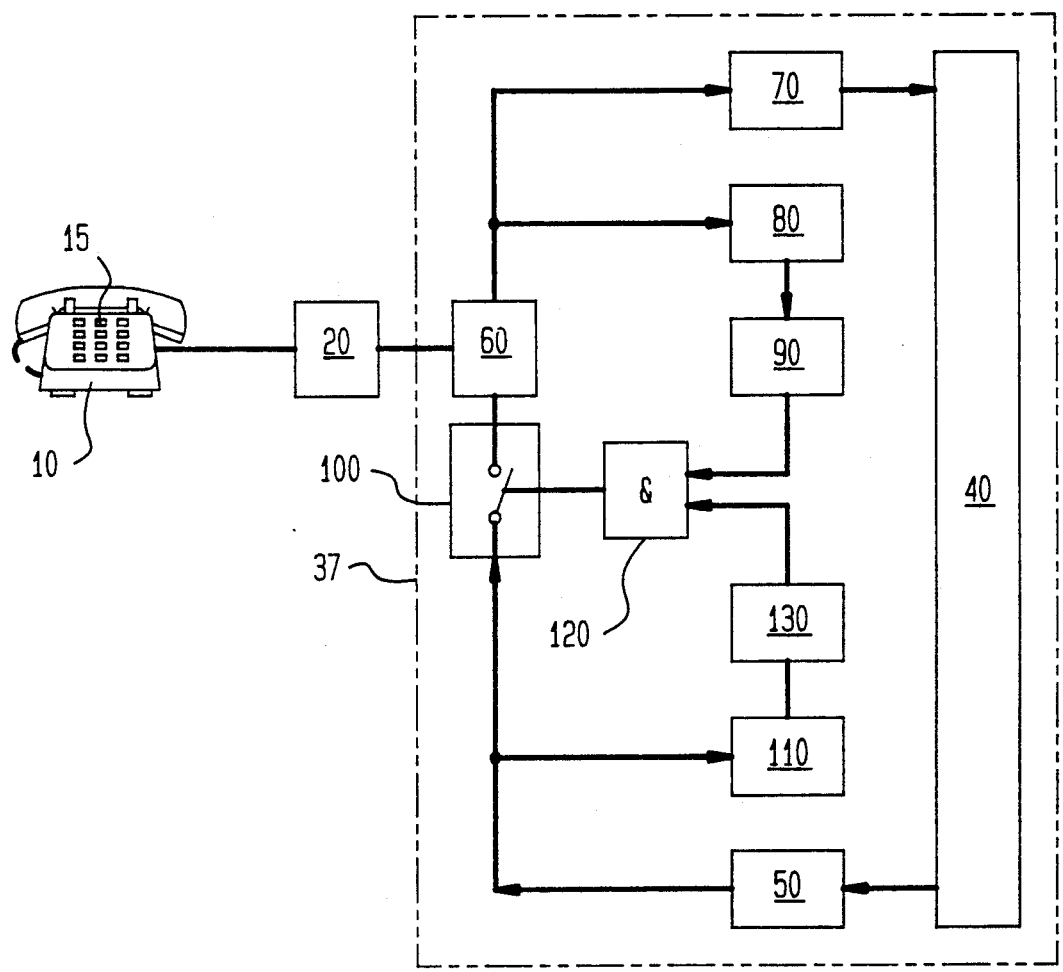
FIG. 3 shows the block diagram of FIG. 5 of the '872 patent which utilizes a separate "non-voice protected" DTMF receiver to monitor the output from a speech decoder 50 to prevent inadvertent cutoff of VSF transmission.
Figure 4:
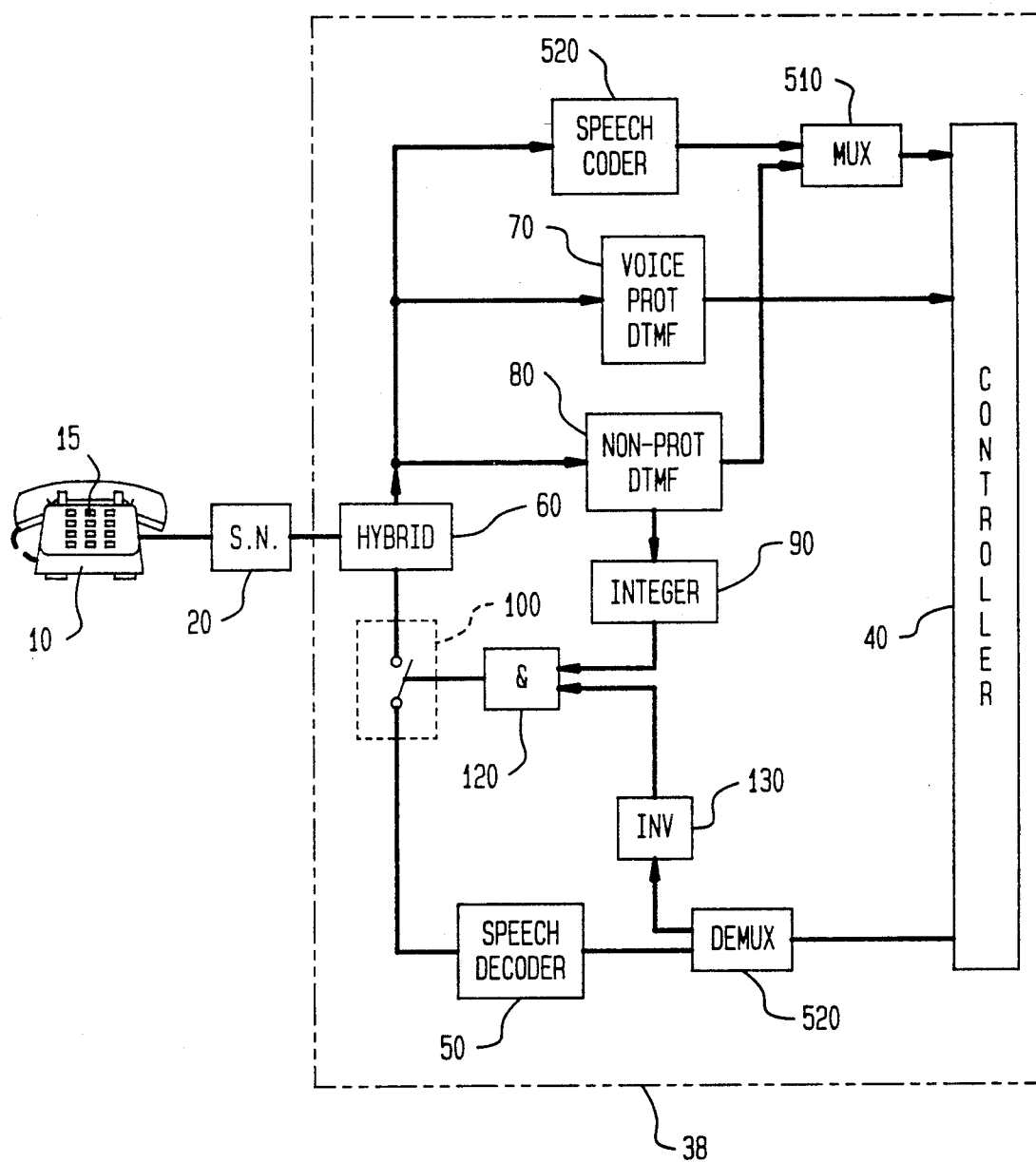
FIG. 4 shows a block diagram of an embodiment of the present invention which solves the same need solved by the prior art embodiment of FIG. 3, however, in a manner which eliminates the need to utilize two "non-voice protected" DTMF receivers.

FIG. 4 shows a block diagram of an embodiment of the present invention which solves the same need solved by the prior art embodiment of FIG. 3, however, in a manner which eliminates the need to utilize two "non-voice protected" DTMF receivers. As shown in FIG. 4, telephone 10 is connected through public switched network 20 to voice store and forward apparatus (VSF 38). Telephone 10 includes TouchTone TM pad 15 which can be used to generate DTMF signals. VSF 38 is comprised of controller 40, speech coder 500, multiplex 510, demultiplex 520 and speech decoder 50. Speech coder 500 is apparatus which is well known to those of ordinary skill in the art which receives an input in the form of, for example, an audio message which has been transmitted by a user from telephone 10 through hybrid network 60 and converts the input into a digital signal. The digital signal which is output from speech coder 500 is applied as input to multiplex 510. Multiplex 510 is apparatus which is well known to those of ordinary skill in the art which receives digital output from speech coder 500 and digital output from "non-voice protected" DTMF receiver 80 and multiplexes these two signals into a combined digital signal. Further, the combined digital signal is applied as input to controller 40 for storage thereby in a manner which is well known to those of ordinary skill in the art.

As is well known to those of ordinary skill in the art, the output from "non-voice protected" DTMF receiver 80 is a digital signal which indicates the presence and identity of a DTMF tone. In general digital data represented by the digital output from "non-voice protected" DTMF receiver 80 has little impact on the storage requirements of controller 40 because voice audio data has a digital bit rate in the range of 15-30 Kbps whereas digital output from "non-voice protected" DTMF receiver 80 which outputs a one bit presence indicator of a DTMF tone can be sampled at a rate of about once every 10 milliseconds to yield a 100 bps data rate.

When VSF 38 transmits to a user, demultiplex 520 receives, as input from controller 40, digital data which has been stored in controller 40. Demultiplex 520 is apparatus which is well known to those of ordinary skill in the art, which separates the input into a digital signal which corresponds to the digital signal which was produced in response to an audio message that was received from a user previously and a digital signal that was received from "non-voice protected" DTMF receiver 80. Demultiplex 520 applies the digital signal relating to the audio message as input to speech decoder 50 and demultiplex 520 applies the digital signal relating to input from "non-voice protected" DTMF receiver 80 to inverter 130. As is well known to those of ordinary skill in the art, speech decoder 50 takes an audio message which has been stored by controller 40 in, for example, digital format and converts it into an audio signal which is presented to hybrid circuit 60 for transmission to the switching network 20 and from there, in turn, to telephone 10. During this transmission to the user, "voice-protected" DTMF receiver 70 receives signals transmitted to VSF 38 from telephone 10, decodes any embedded DTMF tones, and transmits the command codes to controller 40.

The output of "non-voice protected" DTMF receiver 80 passes through integrator 90 and the output from integrator 90 is applied, in turn, as input to AND logic circuit 120. The output from inverter 130 is applied as input to AND logic circuit 120 and the output from AND logic circuit 120 is applied, in turn, as input to switch 100.

In the second mode of operation, whenever a user at telephone 10 calls VSF 38 to input an audio message, "non-voice protected" DTMF receiver 80 generates a digital indication each time it "detects" a DTMF tone. This indication is multiplexed by multiplex 510, together with a digital representation of the audio message which is output from speech encoder 500, into a combined digital signal. Then, controller 40 stores the combined digital signal. Later, in the first mode of operation, whenever a user calls VSF 38 and requests a playback of a previously recorded message, the audio output from speech decoder 50 may produce signals that are detected as DTMF tones by "non-voice protected" DTMF receiver 80 as a result of crosstalk on hybrid network 60. However, at substantially the same time, the digital signal output from demultiplex 520 which is applied to inverter 90 and which relates to the original output from "non-voice protected" DTMF receiver 80 should also indicate that a DTMF tone is present, i.e., demultiplex 520 will send a signal to inverter 130 whenever "non-voice protected" DTMF 80 has "originally detected" a DTMF tone. As a result, in this case, both inputs of AND circuit 120 will not be enabled and switch 100 will not be opened. However, on the other hand, if the input to AND logic circuit 120 from "non-voice protected" DTMF 80 is "up" (logical 1) to indicate that the user is transmitting a DTMF tone while VSF 38 is transmitting an audio message and the other input to AND logic circuit 120 from inverter 130 is up (logical 1) because there was no DTMF tone in the original user's audio transmission to VSF 38, AND logic circuit 120 will produce an output to operate switch 100. As a result, switch 100 will open to interrupt VSF 38 output transmissions whenever a user inputs a DTMF tone, however, switch 100 will not interrupt VSF 38 output transmission if there is a spurious DTMF tone emulation in the VSF 38 output transmission. In other words, the embodiment of the inventive VSF 38 shown in FIG. 4 removes interference between user generated DTMF tones and VSF output transmission signals.

Although the above-described embodiment of the present invention prevents interference between VSF output transmission signals and user generated DTMF tones, the problem of self talk-off still remains. Self talk-off occurs because the portions of the VSF output transmission signals that are most likely to cause talk-off are applied to "voice-protected" DTMF receiver 70 by hybrid network 60. In accordance with the present invention, the problem of self talk-off can be prevented by cutting off the output transmission signal from the VSF whenever it is likely to cause "voice-protected"

Figure 5:
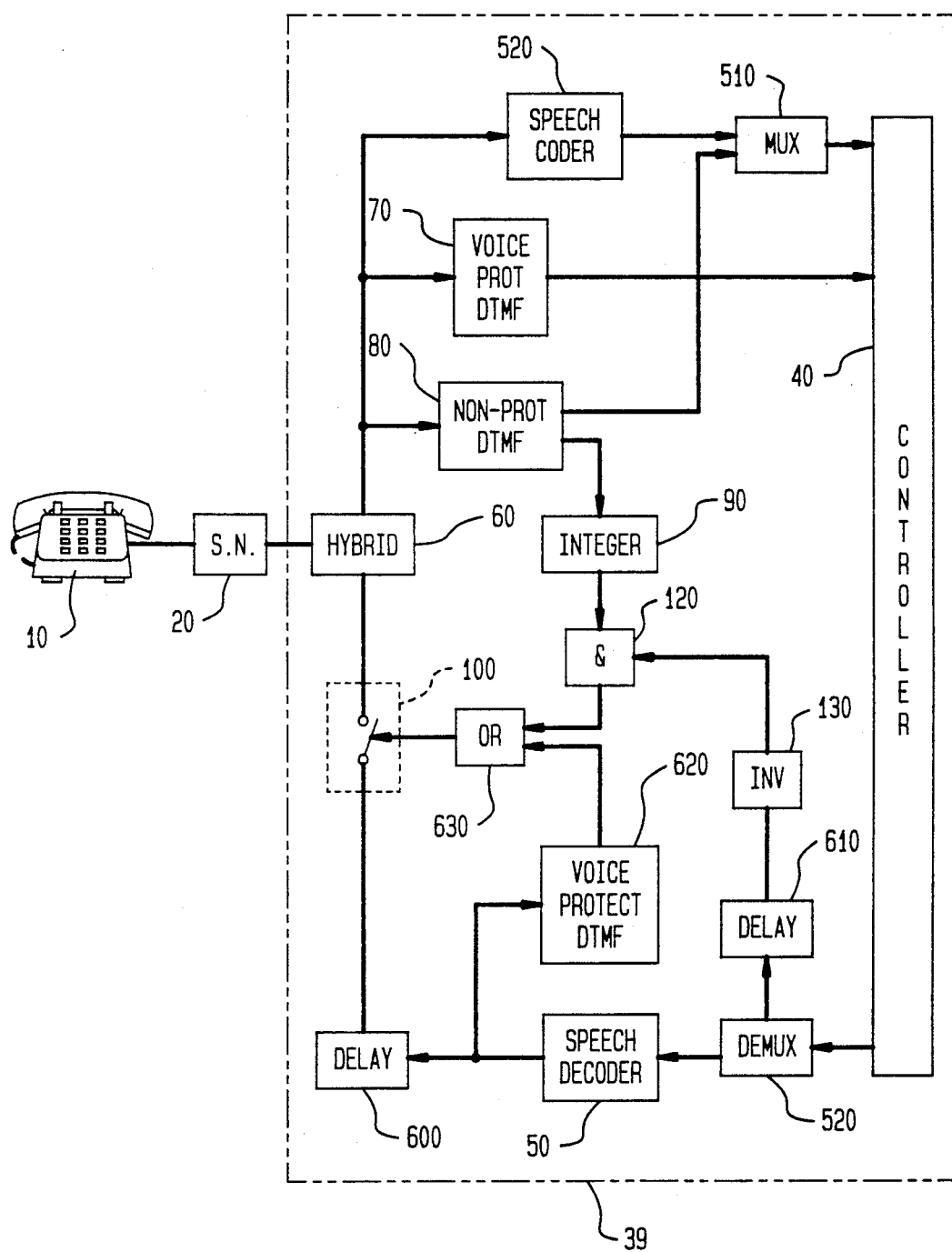
FIG. 5 shows a block diagram of an embodiment of the present invention which solves the same problem solved by the embodiment of FIG. 4 and, in addition, solves the problem of self talk-off.

DTMF receiver 70 to talk-off. In a first embodiment which addresses this problem shown in FIG. 5, this is accomplished with the use of an additional "voice protected" DTMF. VSF 39 shown in FIG. 5 is the same as VSF 38 shown in FIG. 4 except for the addition of delays 600 and 610, "voice protected" DTMF receiver 620, and OR logic circuit 630. The following explanation will focus on the features of VSF 39 of FIG. 5 which differ from those of VSF 38 of FIG. 4.

Figure 1:
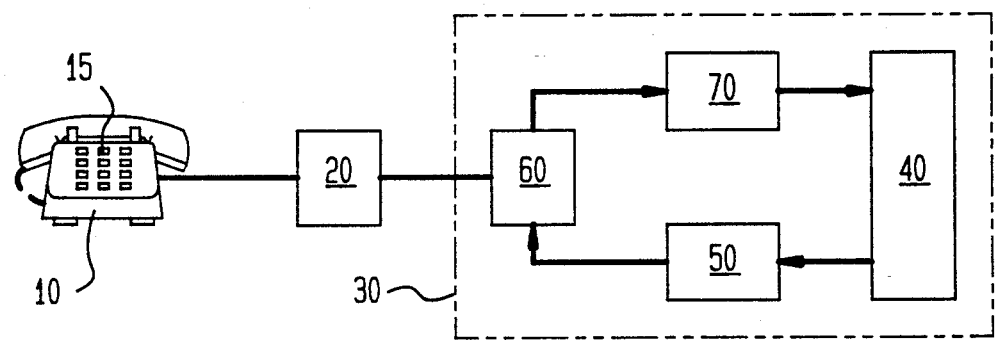
FIG. 1 shows the block diagram of FIG. 1 of U.S. Pat. No. 4,431,872 (the '872 patent) which illustrates certain components of a typical voice store and forward apparatus (VSF)
Figure 2:
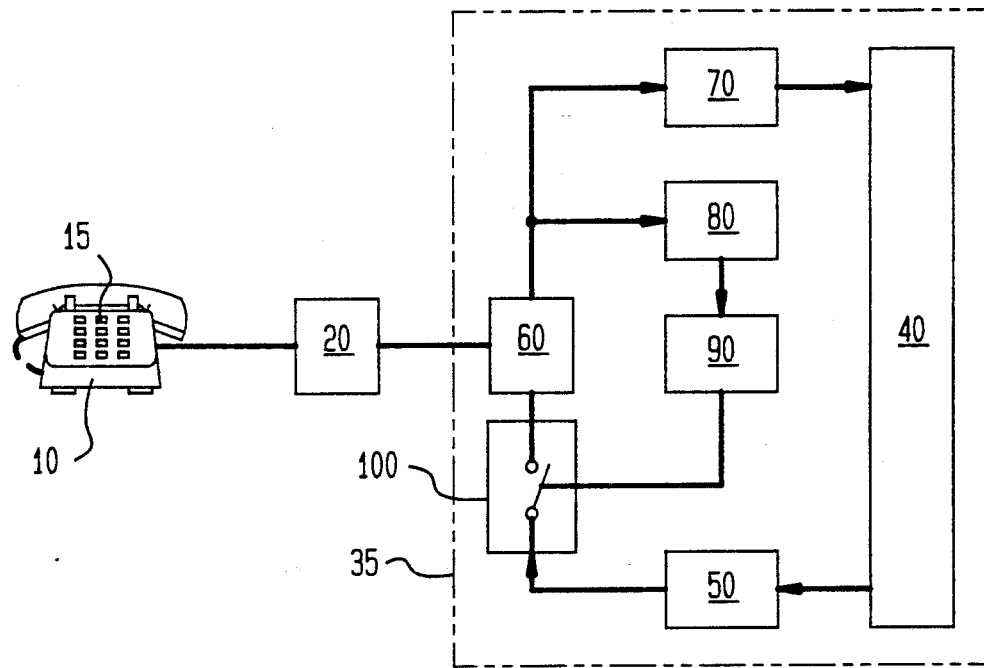
FIG. 2 shows the block diagram of FIG. 3 of the '872 patent which addresses a problem that occurs whenever a user generates a DTMF signal while the VSF is transmitting signals to the user.

The audio output from speech decoder 50 is applied as input to delay 600 and is applied as input to "voice protected" DTMF receiver 620. After passing through delay 600, the audio signal may, as a result of crosstalk through hybrid network 60, be applied as input to "voice protected" DTMF receiver 70. If "voice protected" DTMF receiver 70 identifies the signal as a DTMF tone, it sends a signal to controller 40 and, in response, controller 40 will cease output, believing that the DTMF tone was generated by the user. In the embodiment shown in FIG. 5, "voice protected" DTMF receiver 620 is used to "predict" when this event might occur and, in response thereto, to cut off the output from VSF 39 by causing switch 100 to open. However, in order to cause switch 100 to open at the proper time to prevent "voice protected" DTMF receiver 70 from operating, "voice protected" DTMF receiver 620 needs a "head start." This "head start" will enable "voice protected" DTMF receiver 620 to be able to cause switch 100 to open in time to prevent tripping "voice protected" DTMF receiver 70. The required "head start" is provided by delay 600. Thus, when "voice protected" DTMF receiver 620 detects a DTMF tone, it applies an up (logical 1) to OR logic circuit 630 and OR logic circuit, in turn, applies a signal to switch 100 that causes it to open and prevent self talk-off. While this will cause the VSF output to be cut off, this will happen infrequently as compared to the apparatus shown in FIG. 2 because "voice protected" DTMF receiver 620 will talk-off much less frequently than "non-voice protected" DTMF receiver 80. The remainder of VSF 39 operates in the same manner as does the embodiment shown in FIG. 4, however, delay 610 is needed to match the delay introduced into the audio output by delay 600. As one can readily appreciate, the use of second "voice protected" DTMF receiver 620 can also be added to the prior art embodiment shown in FIG. 3 to perform a similar function. However, if second "voice protected" DTMF receiver 620 were added to the prior art embodiment shown in FIG. 3, then only one delay would be needed instead of the two delays indicated for the embodiment shown in FIG. 5, i.e., a delay would be added after the output from speech encoder 50 and before "non-voice protected DTMF receiver 110. Further, if second "voice protected" DTMF receiver were added to the prior art embodiment shown in FIG. 3, "voice protected" DTMF receiver 620 should be positioned so that it would receive the audio signal output from speech decoder 50 before the delay in order that it have a "head-start" on "voice protected" DTMF receiver 70.

Figure 6:
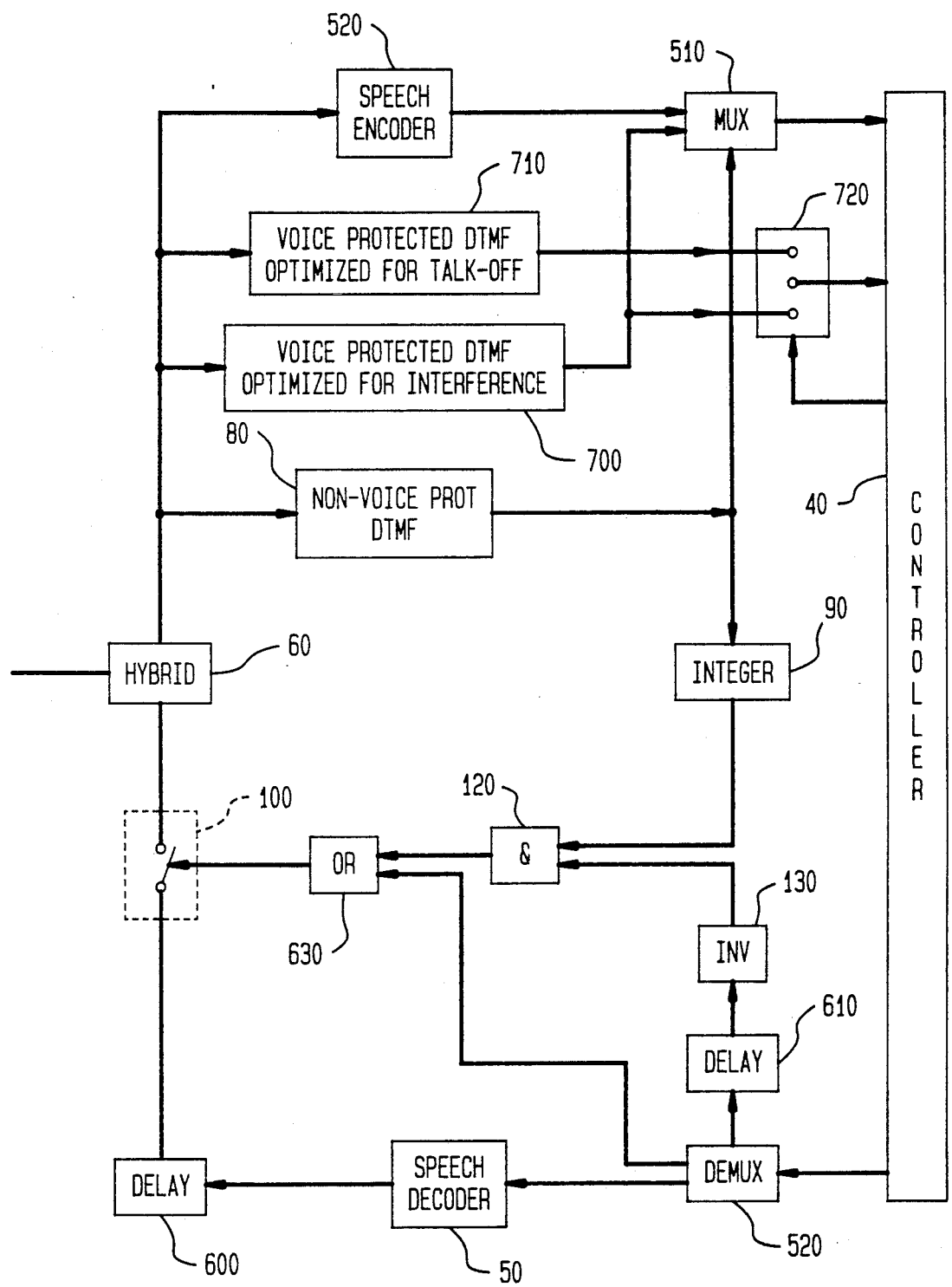
FIG. 6 shows a block diagram of an embodiment of the present invention which solves the same problem solved by the embodiment of FIG. 5 without the use of a second "voice protected" DTMF receiver.

FIG. 6 shows a block diagram of an embodiment of the present invention which solves the same problem solved by the embodiment of FIG. 5 without the use of a second "voice protected" DTMF receiver. In particular, the following will focus on the features of VSF 33 of FIG. 6 which differ from those of VSF 39 of FIG. 5. The embodiment shown in FIG. 6 utilizes three different types of DTMF receivers: (a) "voice protected" DTMF receiver 710 which is optimized for talk-off; (b) "voice protected" DTMF receiver 700 which is optimized for interference performance; and (c) "non-voice protected" DTMF receiver 80. We will discuss below in detail how such DTMF receivers are fabricated, however, at this point, we will discuss some overall features that differentiate their performance. In particular: (a) "voice protected" DTMF receiver 710 which is optimized for talk-off is the most selective of the three receivers in terms of determining whether or not a DTMF tone was detected and it operates the slowest of the three receivers; (b) "voice protected" DTMF receiver 700 which is optimized for interference performance is designed to detect DTMF tones generated by a user in the presence of interference from, for example, crosstalk through hybrid network 60 while VSF 33 is transmitting a message to a user, is the next most selective of the three receivers, and it operates more quickly than receiver 710; and (c) "non-voice protected" DTMF receiver 80 is the least selective of the three receivers and it operates the fastest.

First consider the operation of VSF 33 of FIG. 6 when VSF 33 is receiving an audio message from a user. In this case, controller 40 sends a signal on line 730 to switch 720. In response, switch 720 is placed in an "up" position which provides that output from "voice protected" DTMF receiver 710 which is optimized for talk-off is passed through switch 720 to controller 40 to protect against the spurious detection of DTMF tones which are simulated by the user's audio input. The outputs from "voice protected" DTMF receiver 700 which is optimized for interference and "non-voice protected" DTMF receiver 700 are combined with the digital output from speech encoder 500 in multiplex 510 in the same manner as was described above with reference to FIG. 5 and the combined digital signal is transmitted to controller 40 for storage thereby.

Second, consider the operation of VSF 33 of FIG. 6 when VSF 33 is transmitting an audio message to a user. In this case, controller 40 sends a signal on line 730 to switch 720. In response, switch 720 is placed in a "down" position which provides that output from "voice protected" DTMF receiver 700 which is optimized for interference is passed through switch 720 to controller 40. A combined, stored digital signal is output from storage by controller 40 and it is applied as input to demultiplex 520 which is apparatus which understood by those of ordinary skill in the art. Specifically, demultiplex 520 is apparatus which demultiplexes the input thereto into three signals: (a) the first signal is a digitized audio signal which is applied as input to speech decoder 50; (b) the second signal represents the output from "non-voice protected" DTMF receiver 80 and that signal is applied as input to delay 610; and (c) the third signal represents the output from "voice protected" DTMF receiver 700 which is optimized for interference and that signal is applied as input to OR logic circuit 630. In response to the first signal, speech decoder 50 provides an audio output which is applied as input to delay 600 and, after that, through switch 100 to hybrid network 60. After passing through delay 600, the audio signal may, due to crosstalk through hybrid network 60, be applied as input to "voice protected" DTMF receiver 700 which is optimized for interference. If "voice protected" DTMF receiver 700 identifies the signal as a DTMF tone, it sends a signal to controller 40 and, in response, controller 40 will cease output, believing that the DTMF tone was generated by the user (if this happens, it is undesirable). The third signal which is output from demultiplex 520, which third signal represents the output from "voice protected" DTMF receiver 700 which is optimized for interference signal and which third signal was produced when the audio message was recorded, is used to "predict" when this false detection by receiver 700 might occur and to cut off the output signal from VSF 33 by causing switch 100 to open. However, in order to be able to cause switch 100 to open in time to prevent "voice protected" DTMF receiver 700 from operating, the third signal needs a "head start" to be able to open switch 100 in time to prevent tripping. As was described above with respect to the embodiment shown in FIG. 5, this "head start" is provided by delay 600. Thus, when the output from "voice protected" DTMF receiver 700 would detect a DTMF tone, the third signal applies an up (logical 1) signal to OR logic circuit 630 and OR logic circuit 630, in turn, applies a signal to switch 100 that causes it to open and prevent self talk-off. The remainder of the circuit operates in the same manner as does the similarly numbered apparatus of the embodiment shown in FIG. 5. As one can readily appreciate, the second "voice protected" DTMF receiver of FIG. 5 has been removed by storing the output of "voice protected" DTMF receiver 700.

One of ordinary skill in the art can fabricate embodiments of the present invention as disclosed in FIGS. 4-6 by utilizing an industry standard SSI203 DTMF receiver chip and by utilizing the "Early Detect" signal output therefrom as the "non-voice protected" DTMF receiver output and by utilizing the "Data Valid" signal output as the "voice protected" DTMF receiver output. However, the need to use separate "voice protected" and "non-voice protected" DTMF receivers as shown in the embodiments of FIGS. 4-6 can be eliminated in accordance with the following. The appendix hereto discloses a quadrature-phase, matched filter bank which receives an input audio signal and, in response thereto, produces measurements which can be used to implement "voice protected" as well as "non-voice protected" DTMF receivers. Specifically, the filter bank periodically outputs measurements of the DTMF component amplitudes and total signal power in the form of three numbers. The signal component amplitudes are compared to each other to determine signal twist and the total signal power is tested to determine whether the input met well known minimum requirements for DTMF tones. Further, the signal component amplitudes are compared to total signal power to estimate the signal-to-noise ratio. A counter is used to indicate the time duration of the signal.

Each of the above-described tests utilizes thresholds and a signal input measurement must exceed all thresholds before a DTMF tone can be reported. By varying the thresholds, different levels of receiver performance can be achieved. For example, strict thresholds result in a "voice protected" DTMF receiver which is optimized for talk-off performance; relaxing these thresholds slightly results in a "voice protected" DTMF receiver which is optimized for recognition in the presence of voice interference; and relaxing these thresholds by a large amount results in a "non-voice protected" DTMF receiver.

Further, a "voice protected" DTMF receiver is generally designed to trade off talk-off performance with recognition of DTMF tones in the presence of voice interference. Even when one uses the apparatus shown in FIGS. 2-5, voice interference will be present during part of the received tone. This can effectively shorten the length of the received tone, causing misrecognition. The effect of this shortening of the effective length of the tone can be reduced by making the receiver more tolerant of voice interference. Unfortunately, making the receiver more tolerant of such interference necessarily makes the receiver more likely to talk-off from user input, thus different receivers are used at different times.

Although we have described the present invention in terms of the different functional components in order to better be able to describe the functional components, the manner in which these functional components operate and the manner in which these functional components interact with one another should be clear to those of ordinary skill in the art. Further, one of ordinary skill in the art should readily appreciate that present day circuitry has been able to provide chips which combine several functional components together on a single chip. For example, the hybrid network and the speech digitization are combined in an industry standard "combo codec." Still further, preferred embodiments of the inventive apparatus disclosed in FIGS. 4-6 comprise software which is executed on special purpose microprocessors. Specifically, the speech encoder and speech decoder comprise speech data reduction algorithms which execute on a digital signal processor (DSP) such as, for example, the TMS320C25 DSP which is commercially available from Texas Instruments. The DTMF filter bank and the DTMF detection algorithms which evaluate the output from the filter bank to provide the various receivers are implemented in software which is executed on the same DSP. The delay functions are implemented as LIFO operations in the memory of the DSP and the random logic circuits may be implemented as decision algorithms within the DSP. Finally, the data multiplexing and demultiplexing and the data transferral are performed by a general purpose microprocessor such as, for example, the Intel 80186. Each software portion of the preferred embodiments is a straightforward translation of the functions which have been described in detail above to code which anyone of ordinary skill in the art can implement.

APPENDIX

MULTIFREQUENCY DETECTION

A multifrequency detector described herein provides detection and differentiation of multifrequency tones by using a variety of filters to detect frequencies and tones and, in particular, to detect all sixteen of the DTMF tones with high selectivity and speed. Specifically, the multifrequency detector provides selectivity of filtering of a signal sample by using: (a) a finite impulse response filter; (b) a quadrature-phase, matched filter; and (c) a weighted summing of signal samples to control the selectivity of the filtering.

The multifrequency detector operates by processing a stored set of samples of a signal to determine whether the samples are indicative of a specific frequency or tone. A selective processing of the stored samples is used to make an initial determination of a frequency or tone indication. If a tone or frequency is indicated, then the rest of the signal sample is filtered to selectively verify the indicated frequency or tone. These results are combined with the selective processing for additional processing to further verify that the tone or frequency has been accurately determined. Techniques such as quadrature-phase, matched filtering, signal power matching, and signal-to-noise ratio measurement are used to increase the selectivity of the processing.

In the multifrequency detector, an audio signal is applied to a sampler which buffers several samples so that a digital signal processor (DSP) can process the samples in a block. The DSP is a general purpose digital signal processor of the type described in "DSP PRODUCTS DATABOOK", *Analog Devices, Inc.*, 1987 and "TMS320C25 User's Guide", *Texas Instruments, Inc.*, 1986.

The sampling takes place at the rate of eight thousand samples per second which is higher than the four thousand samples per second necessary to accommodate the highest frequency DTMF component (sixteen hundred thirty-three Hz.). Because of this lesser requirement, only the even numbered samples are processed by the signal processing preselection algorithm. The even samples are input to a quadrature-phase, matched filter and processed as described below to determine whether the signal power falls within the frequency bands allocated for the DTMF tones.

The two specific cases that the signal processing is designed to accommodate are: (a) correctly labeling DTMF tones and (b) detecting and eliminating noise. To detect and eliminate noise, the odd numbered samples are filtered from the original samples and input to the quadrature-phase, matched filters at one DTMF high band group frequency and one low band group frequency to detect the DTMF tones. If the filter detects a tone, then it will reinforce the initial finding that a DTMF tone has been received. If the filter does not detect a tone, then this additional processing increases the rejection of noise.

Functional Detection Processing

Step 1: The even samples are initially filtered to make an initial determination of the tone/frequency.

Step 2: The odd samples are filtered to make a preliminary verification of the tone/frequency detected in step 1. This test is primarily for rejecting signals with poor signal-to-noise ratios and single tones which can confuse step 3. The results from this step are added to step 1 to create a resultant sample that is used in step 3 processing.

Step 3: This step tests to assure that the tone stays consistent for about forty milliseconds and reinforces the minimum tone requirements. The processing rejects the tone if:
    (a)  the minimum signal power requirement is not met by the filter outputs;
    (b)  there is a more than +/- 3.5% frequency deviation or if the twist is excessive; or (c) the signal-to-noise ratio is excessive.

Program Logic

The detailed logic of the invention is presented through Pascal code which is used to simulate a preferred embodiment of the multifrequency detector on an Intel 80286 processor for testing purposes. One of ordinary skill in the art could readily translate the Pascal implementation of the preferred embodiment into a detection system without undue experimentation on the above-mentioned digital signal processor.

The detector detects DTMF tones of various "stage values." The stage value indicates if the "detection hit" is "voice protected," "voice protected optimized for interference," or "non-voice protected." The program reads in linear data (integer format, 8159 = +3.17dbm) and determines whether a DTMF tone is present. Quadrature-phase, matched filters are used to detect the presence of each of the eight tones that need to be detected.

The program inputs data in 82 sample blocks; a sample block is used to provide approximately 10 msec of input. Each sample block is examined for the presence of a tone, i.e., it is tested for amplitude, signal-to-noise-ratio (SNR), and twist, and labeled accordingly. If the input does not meet strict requirements, i.e., a maximal value of SNR and +4/-8 db of twist, then it is tested against less stringent limits, i.e, 7 dB SNR and +/- 12 db of twist. A tone which meets the strict requirements is labeled a stage 1 short term hit and a tone which meets the less strict requirements is labeled a stage 2 or a stage 3 short term hit. Next four short term results are combined to form a long term result. Four of the short term results must be hits for the same DTMF value or the long term result is labeled invalid. The long term result is then assigned a stage value corresponding to the stage value of the greatest of the matching short term results. If the long term hit is a stage 1 hit and it has twist within +4/-8 db, 0 db SNR, and at least -20 dbm of power, it is reported as a "voice protected" hit. If the long term hit is a stage 2 hit, i.e., it has twist within +10/-10 db, -1 db SNR, and at least -33 dbm of power, it is reported as a "voice protected hit optimized for voice interference." If it is neither of the above, it is tested against stage 3 requirements, i.e., "non-voice protected." A stage 3 long term hit is required to have less than +/-12 db twist, -36 dbm of power, and -3 db SNR. If none of these tests are met, then a miss is reported.

Several processing power short cuts are used. Specifically, for each 82 sample block, we 2:1 decimate the input and decide which DTMF digit is present on the basis of signal power in each band. Then, only for the proposed DTMF digit, the skipped samples are filtered and added in. When adding the four 82 sample blocks together, they must be phase shifted according to the equations below. These equations are written assuming unmodified quadrature-phase, matched filters. The same arithmetic is used, but must be justified by testing the frequency response of the resultant long term filters.

$$82 \text{ sample block} = \sum_{n=0}^{81} x(n) * \exp(twopi * i * f * n / F)$$

The above equation is a mathematical representation of a quadrature-phase, matched filter.

$$\text{Desired 328 sample block} = \sum^{327} x(n) * \exp(twopi * i * f * n / F)$$

To remove redundant calculations, we process the 328 sample block as follows:

$$= \sum_{n=0}^{81} x(n) * \exp(twopi * i * f * n / F) + \sum_{n=82}^{163} x(n) * \exp(twopi * f * f * n / F)$$

$$+ \sum_{n=164}^{245} x(n)*\exp(twopi*i*f*n/F) + \sum_{n=246}^{327} x(n)*\exp(twopi*f*f*n/F)$$

$$= \sum_{n=0}^{81} x(n)*\exp(twopi*i*f*n/F) + \sum_{n=0}^{81} x(n+82)*\exp(twopi*f*f*(n+82/F)$$

$$+ \sum_{n=0}^{81} x(n+164)*\exp(twopi*i*f*(n+164)/F) +$$

$$\sum_{n=0}^{81} x(n+246)*\exp(twopi*f*f*(n+246)/F)$$

$$= \sum_{n=0}^{81} x(n)*\exp(twopi*i*f*n/F)$$

$$+ \exp(twopi*i*f*82/F)*\sum_{n=0}^{81} x(n+82)*\exp(twopi*i*f*n/F)$$

$$+ \exp(twopi*i*f*164/F)*\sum_{n=0}^{81} x(n+164)*\exp(twopi*i*f*n/F)$$

$$+ \exp(twopi*i*f*246/F)*\sum_{n=0}^{81} x(n+246)*\exp(twopi*i*f*n/F)$$

(The bandwidth of the filter can be controlled by multiplying each of the four terms above with weights, similar to using a window with a filter.)

```
CONST     FILTERPOINTS = 82;
          Fudge =1.2;
{Fudge compensates the SNR calculation for the following problems:
     (a)  each matched filter is not orthogonal to the alternate band
          tone;
     (b)  each matched filter is not an integral number of cycles of
          the tone that is being recognized.
     (c)  a finite SNR must be tolerated.
Fudge is multiplied by the matched filter coefficients.}
          SampleRate = 8000.0;
          Stage1Count = 3;
          Stage2Count = 4;
          Stage3Count = 7;
          DTMFMaxMiss = 4;
TYPE      INBUFFTYPE = ARRAY[0..255] OF integer;
VAR       FREQ : ARRAY[1..4] OF ARRAY[1..2] OF REAL;
          INBUFF : INBUFFTYPE;
          INBUFFCOUNT : INTEGER;
          FILTERBUFF : ARRAY[0..FILTERPOINTS] OF REAL;

ToneValue : ARRAY[1..4] OF INTEGER;
          StageValue : ARRAY[1..4] OF INTEGER;
          ToneData : ARRAY[1..4] OF ARRAY[1..2] OF ARRAY[1..2] OF REAL;
          Power : ARRAY[1..4] OF REAL;

Power1,PowerH : REAL;
          IOBETA : REAL;
```

```
        B : ARRAY[1..4] OF ARRAY[1..2] OF REAL;
        MatchedFilter : ARRAY[1..4] OF ARRAY[1..2] OF
                                      ARRAY[0..FILTERPOINTS] OF REAL;
        MFOut : ARRAY[1..4] OF ARRAY[1..2] OF ARRAY[1..2] OF REAL;
        PhaseShift : ARRAY[1..4] OF ARRAY[1..2] OF ARRAY[1..4] OF
                                      ARRAY[1..2] OF REAL;
        InChar : Char;
        InputFile : File of INBUFFTYPE;
        DTMFFILE : TEXT;
        FileName : String[32];
        I,J,K,L : INTEGER;
        TWOPI : REAL;
        ShortStage1HighTwist,ShortStage1LowTwist,ShortStage1Fudge :
                                                                REAL;
        ShortStage2HighTwist,ShortStage2LowTwist,ShortStage2Fudge :
                                                                REAL;
        ShortStage3Fudge,ShortStage3HighTwist,ShortStage3LowTwist :
                                                                REAL;
        LongStage1Fudge,LongStage1HighTwist,LongStage1LowTwist : REAL
        LongStage2Fudge,LongStage2HighTwist,LongStage2LowTwist : REAL
        LongStage3Fudge,LongStage3HighTwist,LongStage3LowTwist : REAL
        Stage1MinPower,Stage2MinPower,Stage3MinPower : REAL;
        LastReport : BOOLEAN;
        temp : real;
        DTMFState : (Idle,CountMisses);
        DTMFHitValue : INTEGER;
        MinReportStage : integer;

{These routines are used to generate a Kaiser window.  A four point
Kaiser window is used to shape the response of the long term filters.
These routines are the same as those provided in the prior art by the
well known reference of Rabiner and Gold.)

FUNCTION FLOAT(I : INTEGER):REAL;
BEGIN
   FLOAT := I;
END;

FUNCTION IO(X:REAL):REAL;
VAR      Y,T,E,DE,SDE : REAL;
         II : INTEGER;
BEGIN
   Y := X/2.0;T := 1.0E-8;E:= 1.0;DE := 1.0;
   FOR II := 1 TO 25 DO
   BEGIN
      DE := DE*Y/FLOAT(II);
      SDE := DE*DE;
      E := E + SDE;
      IO := E;
      IF E*T-SDE > 0 THEN EXIT;
   END;
END;

FUNCTION KAISER(BETA,N,CYCLELENGTH:REAL):REAL;
VAR      TEMP : REAL;
BEGIN
   TEMP := 1.0-4.0*(N*N)/((CYCLELENGTH-1)*(CYCLELENGTH-1));
   IF TEMP > 0 THEN
      KAISER := IO(BETA*SQRT(TEMP))/IOBETA
   ELSE IF TEMP > -1E-8 THEN
      KAISER := 1.0/IOBETA
   ELSE
      KAISER := 0.0;
END;
```

```
PROCEDURE Window;
VAR       Correction : real;
          TempKaiser : REAL;
BEGIN
   FOR I := 1 TO 4 DO FOR J := 1 TO 2 DO
   BEGIN
{ Correction ensures that all of the long term filters have the same
maximum response, regardless of beta }
      Correction := 0.0;
      FOR K := 1 TO 4 DO
      BEGIN
         IOBETA := IO(B[I,J]);
         TempKaiser := KAISER(B[I,J],FLOAT(K-1)-1.5,4);

PhaseShift[I,J,K,1] :=
            TempKaiser*COS(TWOPI*Freq[I,J]*FLOAT(FilterPoints*
                                                   (K-1))/SampleRate);
         PhaseShift[I,J,K,2] :=
            TempKaiser*SIN(TWOPI*Freq[I,J]*FLOAT(FilterPoints*
                                                   (K-1))/SampleRate);
         Correction := TempKaiser+Correction;
      END;
      FOR K := 1 TO 4 DO
      BEGIN
         PhaseShift[I,J,K,1] := PhaseShift[I,J,K,1]/(Correction);
         PhaseShift[I,J,K,2] := PhaseShift[I,J,K,2]/(Correction);
      END;
   END;
END;

(This procedure fills the filter storage from the input data file.)

FUNCTION GetInputData:BOOLEAN;
BEGIN
   GetInputData := TRUE;
   FOR I := 0 TO FILTERPOINTS-1 DO
   BEGIN
      IF INBUFFCOUNT = 0 THEN
      BEGIN
         IF EOF(InputFile) AND (I=0) THEN
         BEGIN
            GetInputData := FALSE
         END ELSE
         IF NOT(EOF(InputFile)) THEN
         BEGIN
            READ(InputFile,INBUFF);
            INBUFFCOUNT := 256;
         END ELSE BEGIN
            INBUFF[255] := 0;
            INBUFFCOUNT := 1;
         END;
      END;
      FilterBuff[I] := float(INBUFF[256-INBUFFCOUNT])/5656.0;
      INBUFFCOUNT := INBUFFCOUNT-1;
   END;
END;

PROCEDURE SHORTTERMFILTER;
BEGIN
(This is the decimated filter for initial selection)
      FOR J := 1 TO 4 DO
      FOR L := 1 TO 2 DO
      FOR K := 1 TO 2 DO
```

```
      BEGIN
        MFOut[J,L,K] := 0.0;
        FOR I := 0 TO (FilterPoints DIV 2) - 1 DO
        BEGIN
            MFOut[J,L,K] := MFOut[J,L,K]+FilterBuff[I*2]*
                                        MatchedFilter[J,L,I*2,K]
        END;
      END;

{Now we must decide what DTMF is most likely}
      J := 1;
      L := 1;
      FOR I := 1 TO 2 DO
      BEGIN
        TEMP := 0.0;
        FOR K := 1 TO 4 DO
        BEGIN
            IF MFOut[K,I,1]*MFOut[K,I,1]+MFOut[K,I,2]*MFOut[K,I,2]
                                                            > TEMP THEN
            BEGIN
              TEMP := MFOut[K,I,1]*MFOut[K,I,1]+MFOut[K,I,2]*MFOut[K,I,2]
              IF I = 1 THEN L := K ELSE J := K;
            END;
        END;
      END;
      ToneValue[4] := (L-1)*4 + J-1;
{ Now that the DTMF value is decided, we can fill in the skipped
samples}
{Here we do the high frequencies}
      FOR I := 0 TO (FilterPoints DIV 2) - 1 DO
      FOR K := 1 TO 2 DO
      BEGIN
        MFOut[J,2,K] := MFOut[J,2,K]+FilterBuff[I*2+1]*
                                      MatchedFilter[J,2,(I*2+1),K]
      END;
{Here we do the low frequencies}
      FOR I := 0 TO (FilterPoints DIV 2) - 1 DO
      FOR K := 1 TO 2 DO
      BEGIN
        MFOut[L,1,K] := MFOut[L,1,K]+FilterBuff[I*2+1]*
                                      MatchedFilter[L,1,(I*2+1),K]
      END;

{Now we are ready to copy the tone to the FilterBuff data area.
SHORTTERMTEST will then test the data to see if it meets the
requirements for SNR, amplitude and twist.}

FOR K := 1 TO 2 DO
      BEGIN
        ToneData[4,1,K] := MFOut[L,1,K];
        ToneData[4,2,K] := MFOut[J,2,K];
      END;
      Power[4] := 0.0;
      FOR I := 0 TO FilterPoints - 1 DO
        Power[4] := Power[4]+FilterBuff[I]*FilterBuff[I];
END;

PROCEDURE SHORTTERMTEST;
BEGIN
{Now we are ready to test the data to see if it meets the requirements
for SNR, amplitude, and twist.}
      Power1 := ToneData[4,1,1]*ToneData[4,1,1]+ToneData[4,1,2]*
                                                  ToneData[4,1,2];
```

```
      Powerh := ToneData[4,2,1]*ToneData[4,2,1]+ToneData[4,2,2]*
                                                      ToneData[4,2,2];
      StageValue[4] := -1;

{Check for stage3 hit}
      IF    ((Power[4]*ShortStage3Fudge) < (Power1 + Powerh)) AND
            ((ShortStage3LowTwist * Power1) < Powerh) AND
            (Power1 > (Powerh*ShortStage3HighTwist)) THEN StageValue[4]
                                      .                          := 3;

{Check for stage2 hit}
      IF    ((Power[4]*ShortStage2Fudge) < (Power1 + PowerH)) AND
            ((ShortStage2LowTwist * Power1) < Powerh) AND
            (Power1 > (Powerh*ShortStage2HighTwist)) THEN StageValue[4]
                                                                 := 2;

{Check for stage1 hit}
      IF    ((Power[4]*ShortStage1Fudge) < (Power1 + Powerh)) AND
            ((ShortStage1LowTwist * Power) < Powerh) AND
            (Power1 > (Powerh*ShortStage1HighTwist)) THEN StageValue[4]
                                                                 := 1;
END;

PROCEDURE LONGTERMFILTER;
VAR       TEMPToneData : ARRAY[1..2] OF ARRAY[1..2] OF REAL;
          MaxStage : INTEGER;
BEGIN
{Now we have completed the testing of the short term DTMF, we need to
generate and test the long term DTMF.  If each of the 4 short term
filter outputs indicates the same tone present, then we can calculate
the long term filter output and repeat all of the above tests on the
long term filter output with slightly different fudge factors.}

K := (ToneValue[1] AND 3) + 1;
      L := ((ToneValue[1] AND $0C) DIV 4) + 1;
      MaxStage := 0;

{Add up the long term signal power for the input.  If every signal
matches, then all is OK, if any signal does not match then the entire
filter output is labeled invalid (tonevalue set to -5)}

TEMPToneData[1,1] := 0.0;TEMPToneData[1,2] := 0.0;
      TEMPToneData[2,1] := 0.0;TEMPToneData[2,2] := 0.0;
      FOR I := 1 TO 4 DO
      BEGIN
         IF (ToneValue[1] = ToneValue[I] AND (StageValue[I] > 0) THEN
         BEGIN If StageValue[I] > MaxStage THEN MaxStage := StageValue[I];

For J := 1 TO 2 DO
            BEGIN

TEMPToneData[J,1] :=
                  TEMPToneData[J,1] +
                  ToneData[I,J,1]*PhaseShift[L,J,I,1]-
                  ToneData[I,J,2]*PhaseShift[L,J,I,2];

TEMPToneData[J,2] :=
                  TEMPToneData[J,2] +
                  ToneData[I,J,1]*PhaseShift[L,J,I,2]+
                  ToneData[I,J,2]*PhaseShift[L,J,I,1];
```

```
                END;
            END ELSE MaxStage := 4;
        END;

{ Copy back the results }
        FOR I := 1 TO 2 DO FOR J := 1 TO 2 DO ToneData[1,I,J] :=
                                                    TEMPToneData[I,J];

{ If MaxStage is out of range, set StageValue[1] to -2}
        If (MaxStage >= 4) or (MaxStage <= 0) then
            StageValue[1] := -2
        else
            StageValue[1] := MaxStage;

END;

PROCEDURE LONGTERMTEST;
BEGIN
{ Now we have the long term filter results and need to test SNR and
twist }
        Powerl := ToneData[1,1,1]*ToneData[1,1,1]+ToneData[1,1,2]
                                                    *ToneData[1,1,2]
        Powerh := ToneData[1,2,1]*ToneData[1,2,1]+ToneData[1,2,2]
                                                    *ToneData[1,2,2]

CASE StageValue[1] OF
          1 : BEGIN
              if ((LongStage1LowTwist * Powerl) > Powerh) OR
                 (Powerl < (Powerh*LongStage1HighTwist)) OR
                 ((Powerl+Powerh) < (LongStage1Fudge*Power[1])) OR
                 ((Powerl+Powerh) <.Stage1MinPower) THEN
                                                    StageValue[1] := -3;
          END;
          2: BEGIN
              if ((LongStage2LowTwist * Powerl) > Powerh) OR
                 (Powerl < (Powerh*LongStage2HighTwist)) OR
                 ((Powerl+Powerh) < (LongStage2Fudge*Power[1])) OR
                 ((Powerl+Powerh) < Stage2MinPower) THEN
                                                    StageValue[1] := -3;
          END;
          3: BEGIN
              if ((LongStage3LowTwist * Powerl) > Powerh) OR
                 (Powerl < (Powerh*LongStage3HighTwist)) OR
                 ((Powerl+Powerh) < (LongStage3Fudge*Power[1])) OR
                 ((Powerl+Powerh) < Stage3MinPower) THEN
                                                    StageValue[1] := -3;
          END;
          ELSE;
        END;
END;

PROCEDURE ReportHITS;
BEGIN
    CASE DTMFState OF
        Idle : BEGIN
            DTMFState := CountMisses;
            case StageValue[1] of
                1: writeln(ToneValue[1]:1,' Voice protected DTMF detected');
                2: writeln(ToneValue[1]:1,' Voice prot. optimized for
                                                    speaker interference');
                3: writeln(ToneValue[1]:1,' Non-Voice protected DTMF
                                                               detected');
                else DTMFState := Idle;
```

```
              end;
              DTMFHitValue := ToneValue[1];
              MinReportStage := StageValue[1];
            END;
            CountMisses : BEGIN
              if (StageValue[1] < 0) or (DTMFHitValue <> ToneValue[1]) then
              begin
                DTMFState := Idle;
                writeln('Going idle, turn on voice');
              end else if StageValue[1] < MinReportStage then
              begin
                case StageValue[1] of
                  1: writeln(ToneValue[1]:1,' Voice protected DTMF
                                                          detected');
                  2: writeln(ToneValue[1]:1,' Voice prot. optimized for
                                                  speaker interference');
                  else writeln('Error in program!');
                end;
                MinReportStage := StageValue[1];
              end;
            END;
          END;
        END;

{**************************************************
Main Routine
**************************************************}

BEGIN
  DTMFState := Idle;
  LastReport := FALSE;
  TWOPI := 8.0*ARCTAN(1.0);
{ These are the standard DTMF frequencies }
  Freq[1,1] := 697.0;Freq[2,1] := 770.0;Freq[3,1] := 852.0;
                                                Freq[4,1] := 941.0;
  Freq[1,2] := 1209.0;Freq[2,2] := 1336.0;Freq[3,2] := 1477.0;
                                                Freq[4,2] := 1633.
{ These are the default Beta values.  They are used to generate weights
for the phase shifts for the long term filter calculations in order to
control the bandwidth of the long term filters. }

B[1,1] := 0.0;B[2,1] := 1.5;B[3,1] := 2.0;B[4,1] := 2.5;
  B[1,2] := 4.0;B[2,2] := 6.0;B[3,2] := 8.0;B[4,2] := 12.0;
  Window;
{ These are the empirically determined values for twist etc }
{ HighTwist means that the high tone can be no more than 8 DB greater
than the low tone.  LowTwist means that the low tone can be no more
than 4 db lower than the high tone. }
{ A fudgefactor is added in to compensate for the imperfect filters }
(Progressively more relaxed parameters are available for higher stage
numbers }

ShortStage1HighTwist := exp(ln(10.0)*(-8.0-3.5)/10.0);
  ShortStage1LowTwist  := exp(ln(10.0)*(-4.0-3.5)/10.0);
  ShortStage2HighTwist := exp(ln(10.0)*(-10.0-3.5)/10.0);
  ShortStage2LowTwist  := exp(ln(10.0)*(-10.0-3.5)/10.0);
  ShortStage3HighTwist := exp(ln(10.0)*(-12.0-3.5)/10.0);
  ShortStage3LowTwist  := exp(ln(10.0)*(-12.0-3.5)/10.0);

LongStage1HighTwist := exp(ln(10.0)*(-8.0-5.0)/10.0);
  LongStage1LowTwist  := exp(ln(10.0)*(-4.0-5.0)/10.0);
  LongStage2HighTwist := exp(ln(10.0)*(-10.0-5.0)/10.0);
  LongStage2LowTwist  := exp(ln(10.0)*(-10.0-5.0)/10.0);
```

```
LongStage3HighTwist := exp(ln(10.0)*(-12.0-5.0)/10.0);
LongStage3LowTwist := exp(ln(10.0)*(-12.0-5.0)/10.0);

ShortStage1Fudge := 1.0;
ShortStage2Fudge := 1.0-exp(ln(10.0)*(-15.0)/10.0);
ShortStage3Fudge := 1.0-exp(ln(10.0)*(-7.0)/10.0);

LongStage1Fudge := exp(ln(10.0)*(-3.5)/10.0);
LongStage2Fudge := exp(ln(10.0)*(-3.5)/10.0)*
                         (1.0-exp(ln(10.0)*(-10.0)/10.0));
LongStage3Fudge := exp(ln(10.0)*(-3.5)/10.0)*
                         (1.0-exp(ln(10.0)*(-3.0)/10.0));

{ This should correspond to -33 dbm cycle) }
   Stage1MinPower := exp(ln(10.0)*(-20.0)/10.0);
   Stage2MinPower := exp(ln(10.0)*(-33.0)/10.0);
   Stage3MinPower := exp(ln(10.0)*(-36.0)/10.0);

FOR I := 1 TO 4 DO FOR J := 1 TO 2 DO
   FOR K := 0 TO FilterPoints-1 DO
   BEGIN
      MatchedFilter[I,J,K,1] := Fudge *
         COS(TWOPI*Freq[I,J]*FLOAT(K)/SampleRate) *
         sqrt(2.0/float(FilterPoints));
      MatchedFilter[I,J,K,2] := Fudge *
         SIN(TWOPI*Freq[I,J]*FLOAT(K)/SampleRate) *
         sqrt(2.0/float(FilterPoints));
   END;
   FOR I := 1 TO 4 DO
   BEGIN
      ToneValue[I] := 0;
      Power[I] := 0.0;
      StageValue[I] := -1;
   END;
   FOR I := 1 TO 4 DO FOR J := 1 TO 2 DO FOR K := 1 TO 2 DO
   BEGIN
      ToneData[I,J,K] := 0.0;
   END;
   INBUFFCOUNT := 0;
   WRITE('Enter the input file name : ');READLN(FileName);
   ASSIGN(InputFile,FileName);Reset(InputFile);
   While GetInputData DO
   BEGIN
      SHORTTERMFILTER;
      SHORTTERMTEST;
      LONGTERMFILTER;
      LONGTERMTEST;
      ReportHITS;
{ Update the long term filter storage }
      FOR I := 1 TO 3 DO
      BEGIN
         StageValue[I] := StageValue[I+1];
         ToneData[I,1,1] := ToneData[I+1,1,1];
         ToneData[I,2,1] := ToneData[I+1,2,1];
         ToneData[I,1,2] := ToneData[I+1,1,2];
         ToneData[I,2,2] := ToneData[I+1,2,2];
         ToneValue[I] := ToneValue[I+1];
         Power[I] := Power[I+1];
      END;

END; { while getinput data do }
   CLOSE(InputFile);
END.
```

What is claimed is:

1. Apparatus for use in connection with an interface which receives an analog signal from and applies an analog signal to a telephone line, the apparatus comprising:

detection means, responsive to an analog signal received from the interface, for detecting control signals in the received analog signal and for generating received control indication signals in response thereto;

means for applying at least some of the received control indication signals as input to a storing means and to a decision means;

storing means, responsive to the received analog signal and the at least some of the received control indication signals, for storing a representation of the received analog signal and a representation of the at least some of the received control indication signals; and means for retrieving a representation of a previously stored received analog signal and a representation of a previously stored at least some of the received control indication signals from the storing means and means for applying the representation of the previously stored received analog signal and the previously stored at least some of the received control indication signals as input to the decision means;

wherein the decision means comprises means for applying the previously stored received analog signal to the interface as an output analog signal.

2. The apparatus of claim 1 wherein the decision means comprises:

analog generating means, responsive to the representation of the previously stored received analog signal, for providing an output analog signal;

logic means responsive to the at least some of the received control indication signals and the previously stored at least some of the received control indication signals for determining whether the at least some of the received control indication signals and the previously stored at least some of the received control indication signals indicate detection of control signals and for producing an output of a first type if so and of a second type if not; and switch means, responsive to the output from the logic means, for causing the output analog signal to be applied to the interface.

3. The apparatus of claim 2 wherein the detection means comprises:

"non-voice protected" detection means for providing at least some of the received control indication signals and "voice protected" detection means for providing at least some other received control indication signals.

4. The apparatus of claim 2 wherein the logic means comprises:

inverter means, responsive to the previously stored at least some of the received control indication signals, for logically inverting its input and AND means, responsive to the at least some of the received control indication signals and the output from the inverter means, for logically anding its inputs, the output from the AND means being applied as input to the switch means.

5. The apparatus of claim 2 wherein:

(a) the analog generating means further comprises means for applying the output analog signal as input to said logic means and to a first delay means for delaying the output analog signal;

(b) the logic means comprises:

(i) second delay means, responsive to the previously stored at least some of the received control indication signals which are applied as input thereto, for delaying said input and for applying said delayed input as input to further logic means; and (ii) second detection means, responsive to the output analog signal, for detecting control indication signals therein, for generating output control indication signals in response thereto and for applying the output control indication signals to the further logic means; and the further logic means being further responsive to the at least some of the received control indication signals, and the output from the further logic means being applied as input to the switch means.

6. The apparatus of claim 5 wherein the further logic means comprises:

inverter means, responsive to the delayed previously stored at least some of the control indication signals, for logically inverting its input;

AND means, responsive to the at least some of the received control indication signals and the output from the inverter means, for logically anding its inputs, the output from the AND means being applied as input to an OR means; and the OR means, responsive to the output from the second detection means and the AND means, for logically oring its inputs, the output from the OR means being applied as input to the switch means.

7. The apparatus of claim 6 wherein the detection means comprises:

"non-voice protected" detection means for providing at least some of the received control indication signals and "voice protected" detection means for providing at lest some other received control indication signals.

8. The apparatus of claim 7 wherein the second detection means comprises a "voice protected" detection means.

9. The apparatus of claim 2 which further comprises a delay means, responsive to the output analog signal, for delaying the output analog signal;

wherein the logic means comprises second delay means, responsive to the at least some of the previously stored at least some of the received control indication signals which are applied as input thereto, for delaying said input and for applying said delayed input as input to further logic means; and the further logic means being further responsive to the at least some of the received control indication signals and to the delayed at least some of the previously stored at least some of the received control indication signals, the output from the further logic means being applied as input to the switch means.

10. The apparatus of claim 9 wherein the further logic comprises:

inverter means, responsive to the delayed at least some of the previously stored at least some of the control indication signals, for logically inverting its input;

AND means, responsive to the at least some of the received control indication signals and the output from the inverter means, for logically anding its inputs, the output from and AND means being applied as input to an OR means; and OR means, responsive to the other ones of the previously stored at least some of the control indication signals and the output from the AND means, for logically oring its inputs, the output from the OR means being applied as input to the switch means.

11. The apparatus of claim 9 wherein
the detection means comprises:
"non-voice protected" detection means for providing received control indication signals;
"voice protected" detection means "optimized for talk-off" for providing other received control indication signals; and
"voice protected" detection means "optimized for interference" for providing still other received control indication signals.

12. The apparatus of claim 11 wherein the means for storing a representation of the at least some of the received indication signals stores at least some of the still other received control indication signals from the "voice protected" detection means which is "optimized for interference" and at least some of the received control indication signals from the "non-voice protected" detection means, all as previously stored at least some of the control indication signals.

13. The apparatus of claim 11 which further comprises second switch means, responsive to output from the "voice protected" detection means which is "optimized for talk-off," to output from the "voice protected" detection means which is "optimized for interference," and to output from the means for storing a representation of the received analog signal.

14. Apparatus for use in connection with an interface which receives an analog signal from and applies an analog signal to a telephone line, the apparatus comprising:
detection means, responsive to an analog signal received form the interface, for detecting control signals in the received analog signal and for generating received control indication signals in response thereto;

means for applying at least some of the received control indication signals as input to a storing means and to a decision means;

storing means, responsive to the received analog signal and the at least some of the received control indication signals, for storing a representation of the received analog signal and a representation of the at lest some of the received control indication signals;

means for retrieving a representation of a previously stored received analog signal and a representation of a previously stored at least some of the received control indication signals from the storing means;

means for applying the representation of the previously stored received analog signal as input to analog means and for applying the previously stored at least some of the received control indication signals as input to first delay means;

said analog means being means for providing an output analog signal and for applying the output analog signal to second delay means and to second detection means;

said second delay means, being responsive to the output analog signal, for applying the delayed output to switch means;

said second detection means for detecting control indication signals;

inverter means, responsive to the output from the first delay means, for logically inverting its input;

AND means, responsive to the at least some of the received control indication signals and the output from the inverter means, for logically anding its inputs, the output from the AND means being applied as input to an OR means;

OR means, responsive to the output from the second detection means and the AND means, for logically oring its inputs, the output from the OR means being applied as input to the switch means: and switch means, responsive to the output from the OR means, for causing the delayed output analog signal to be applied to the interface.

15. The apparatus of claim 14 wherein:
the detection means comprises "non-voice protected" detection means for providing the received control indication signals; and
the second detection means comprises "voice protected" detection means.

* * * * *